June 12, 1945. W. A. SCHULZE 2,378,040
PROCESS FOR THE ALKYLATION OF HYDROCARBONS
Filed Dec. 16, 1942
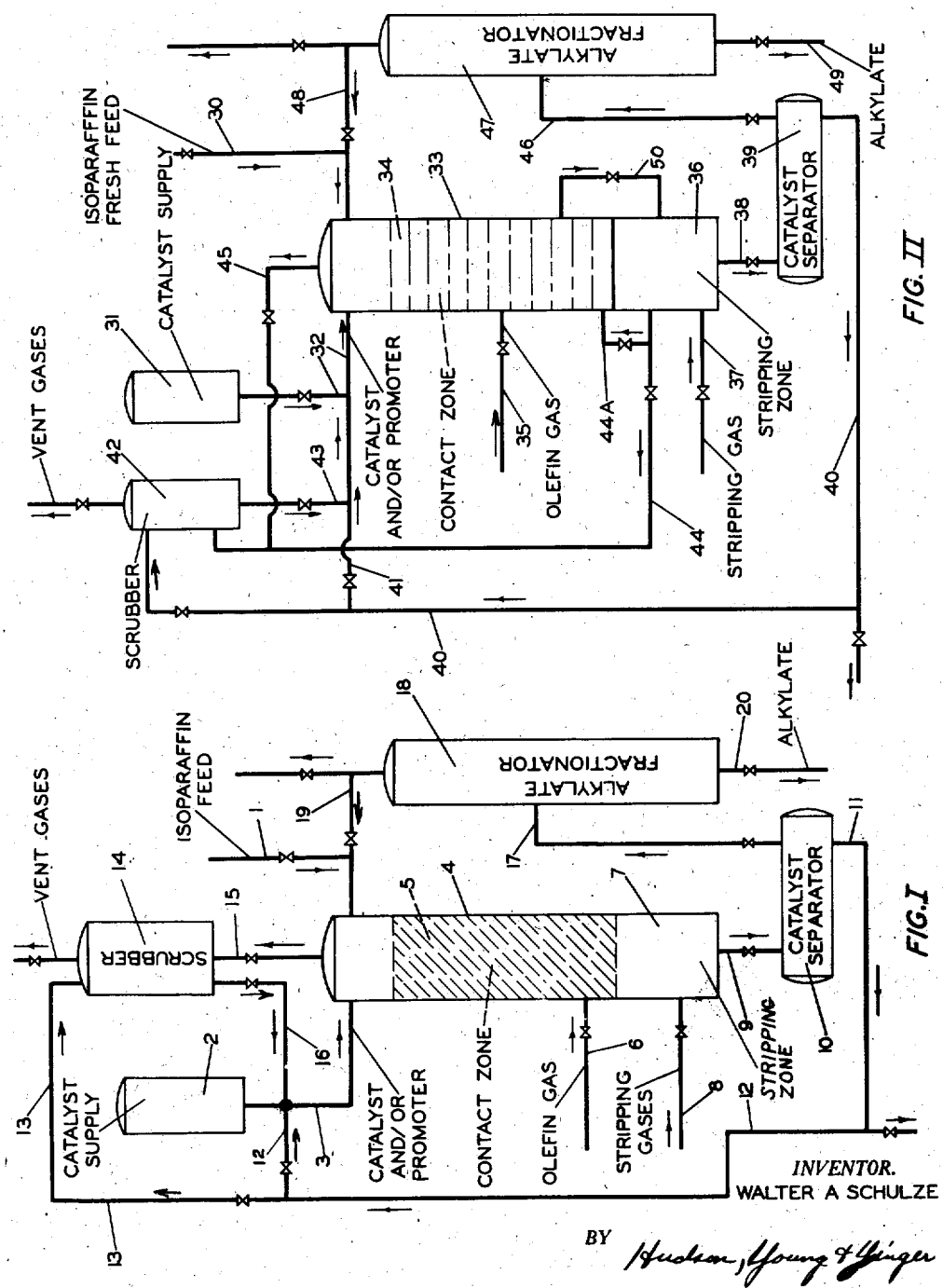
INVENTOR.
WALTER A SCHULZE
BY
ATTORNEYS.

Patented June 12, 1945

2,378,040

UNITED STATES PATENT OFFICE 2,378,040

PROCESS FOR THE ALKYLATION OF HYDROCARBONS

Walter A. Schulze, Bartlesville, Okla., assignor to Phillips Petroleum Company, a corporation of Delaware Application December 16, 1942, Serial No. 469,212

11 Claims. (Cl. 260—683.4)

This invention relates to the alkylation of alkylatable hydrocarbons with low-boiling olefins in the presence of solid or fluid alkylation catalysts. This invention also relates to an improved method for conducting alkylation reactions of the type described whereby greater yields of higher-quality alkylate are obtained and novel means for maintaining optimum catalyst activity and reaction conditions are provided.

It is known that the condensation of certain paraffinic or aromatic hydrocarbons with olefins may be effected by noncatalytic or catalytic means to produce higher molecular weight products of great value in the manufacture of such materials as motor and aviation gasolines, fuel additives, and intermediates for many related organic syntheses. The catalytic promotion of said condensation by agents such as aluminum chloride, other metal halides, strong mineral acids, certain silica-metal oxide gels and the like has been proposed, and the application of these agents to a number of reactions has been described with each particular catalyst usually exhibiting individual characteristics which affect the reaction.

It is also known that reaction conditions are in many cases responsible for variations in the rate and extent of the alkylation reactions and, hence, in the products obtained. Thus, such factors as olefin concentration, contact time, catalyst concentration and physical state, and temperature have been stated to be controlling factors in alkylation. As a result, a number of operational schemes have been suggested to control one or another of said factors in an attempt to benefit the reaction.

The principal difficulties encountered in the commercial application of alkylation processes of various types have been due to changes in the compositions of both hydrocarbon reactants and catalysts during the relatively long reaction periods employed. For example, the changes in the relative concentrations of the original reactants and of several product compounds formed as reaction proceeds and the resultant or concurrent changes in catalyst activity and/or selectivity have resulted in empirical control methods which are difficult to develop and apply.

In the discussion to follow, the term primary reaction will be used to denote any condensation reaction involving the original hydrocarbon reactants. Similarly, the term secondary reactions will denote those involving one or more compounds other than the original reactants and may include molecular rearrangement without change in molecular weight, fragmentation, and/or recombination of the fragments into larger or smaller molecules.

The complex nature of alkylation reactions is indicated by the fact that primary alkylation products are capable of entering into further combinations with the olefinic alkylating agents to an extent at least partially determined by relative concentrations in the reaction zone. Other factors which may affect such secondary combinations are the nature of the catalyst, the location of the alkylating agent (whether in the hydrocarbon or the catalyst phase) and the relative ease of alkylation of the alkylatable compounds added to or formed in the reaction zone.

Further, the stability of the primary and/or secondary products under the alkylation conditions varies greatly, and considerable dealkylation and rearrangement often occurs, producing compounds which can be accounted for only on the basis of the transient presence of olefins, and saturated residues which were not present in the original reactant feed. This rearrangement or recombination of fragments of relatively unstable products may alter the boiling range, octane number and various other characteristics of the alkylate and affect the selectivity of any process. In many instances, as will be exemplified hereinafter, a reasonable degree of secondary combination and/or rearrangement may be beneficial provided excess formation of high boiling products is avoided.

Still further complications result from changes in catalyst composition either during extended service periods or during the course of a single pass or contact period. In the case of catalysts forming hydrocarbon complexes, the characteristics of the catalyst usually correspond to the hydrocarbon composition with which the catalyst is in contact at various points in the reaction zone. Also, in case of catalysts containing volatile or hydrocarbon soluble components transferable to the hydrocarbon phase, a more or less progressive change in activity may be noted, either during continued use of with changes in the composition of the hydrocarbon phase during a single contact period. This is also true in the case of catalysts used with promoters which are added intermittently or continuously to the reaction zone and which are often easily transferred to and carried out by the hydrocarbons. Means of maintaining catalyst compositions and/or activities during use, are therefore of great commercial importance in operations utilizing such catalysts and/or promoters.

It is an object of this invention to provide a novel process for conducting reactions under conditions conducive to more selective and controlled combination.

Another object of this invention is to provide a means of controlling the concentration of one or more reactants at chosen points in an alkylation zone to control the reactions occurring therein.

A further object of this invention is to provide a method for maintaining the activity of an alkylation catalyst susceptible to loss of volatile components or promoters.

A still further object of this invention is to provide a method for maintaining primary reaction rates during alkylation at one or more points in a reaction zone while permitting substantially only secondary reactions in portions of said reaction zone subsequently traversed by the reaction mixture.

Further objects and advantages of my invention will become apparent from the accompanying disclosure and discussion.

I have now discovered that these objects and improvements may be accomplished by a novel method which effectively divides an alkylation reaction vessel, adapted to use of either solid contact or fluid catalysts, into two zones; namely, a contact zone in which primary alkylation reactions are favored and catalyst activity maintained, and a secondary or stripping zone in which secondary reactions are favored by limiting the concentration of original alkylating agent and of volatile catalyst components therein. The provision of the stripping zone further aids in the recovery of volatile or hydrocarbon-soluble materials otherwise carried out by the effluent hydrocarbon liquid.

In one specific embodiment of my invention an alkylation reaction is conducted with improved control of reaction conditions and of alkylate compositions by introducing a mixture of catalyst and liquid isoparaffin or other alkylatable hydrocarbons at the top end of a vertically placed reaction zone to travel concurrently and in a state of intimate contact to the bottom end of said zone, and introducing at an intermediate point a stream of gaseous olefin-containing alkylating agent which flows countercurrent to the said liquid hydrocarbon stream. Said olefin-containing gas, if incompletely reacted and/or dissolved by the incoming liquid hydrocarbon may exist at a point above the point of introduction of the liquid hydrocarbon. In addition, there is added to the reaction zone at a point below the olefin-injection port a stream of substantially inert stripping gas which likewise passes countercurrent to the descending liquid mixture and through the reaction zone to the gas exit line above the point of introduction of the hydrocarbon liquid. The liquid effluent from the reaction zone passes to a separating zone for settling and removal of any catalyst from the hydrocarbon stream. The catalyst is returned to the top of the reactor or may pass first through a scrubber where it contacts gases leaving the top of the reaction zone. The hydrocarbon product is fractionated to separate low-boiling hydrocarbons comprising unreacted feed stock which are recycled to the reaction zone.

In case of a solid or semi-solid catalyst, with or without liquid or gaseous promoters, the operation is similar except that the hydrocarbon liquid travels through the catalyst mass, countercurrent to the olefin-conaining stream and stripping gas. The separating zone may be required in the case of a liquid promoter, although the use catalyst scrubber on the vent gas line may be unnecessary.

The above-listed steps in the present process may be further illustrated by reference to the drawings which are schematic flow diagrams of possible equipment arrangement for practicing my invention in a preferred manner.

Figure I shows an embodiment of the invention particularly adapted to use of either a fluid catalyst or a solid catalyst with a fluid promoter. In this flow diagram, liquid isoparaffin or another alkylatable compound of suitable characteristics is supplied by line 1 to reaction vessel 4, shown in section. Simultaneously, fluid catalyst and/or promoter in the proper porportions is supplied from source 2 and line 3. The liquid hydrocarbon passes downward through contact zone 5 which may be a packed section or granular porous mass adapted to maintaining intimate contact between immiscible liquid phases and between gas and liquid phases. An olefin-containing gas is added to this contact zone through line 6, and while in gas phase travels upward in the reaction vessel.

The descending liquids after passing through the contact zone 5 then travel through a stripping zone 7 which may be relatively quiescent except for the agitation and stripping action of a substantially inert gas, such as nitrogen, methane, etc., introduced to the bottom of the zone through line 8. The stripped alkylate-catalyst mixture then passes through line 8 to separator 10 where the immiscible liquid phases may separate, and catalyst is withdrawn through line 11. This used catalyst may be returned to the reaction vessel through 12, or may pass in some cases to scrubber 14 through line 13. In the scrubber, desirable components of gases leaving the reaction chamber through line 15 are transferred to the catalyst which then passes through line 16 for recycle to the reaction vessel.

Alkylate removed from the separator is taken through line 17 to fractionator 18 where alkylate of proper boiling range is fractionated from unreacted or lower boiling hydrocarbons. The overhead product is returned in the form of liquid reflux to the reaction vessel through line 19, while liquid alkylate is taken through line 20 to storage or any further desirable processing.

In case of a solid or solid-supported catalyst, the contact section 5 is packed with solid granules or particles to permit easy passage of the hydrocarbon liquid and ascending gaseous mixtures. The catalyst supply line may serve to introduce liquid or gaseous promoters for the reaction, with the former being separated by suitable means from the alkylate product. In case of a relatively volatile promoter, suitable absorbents may be supplied as recovery means in the effluent gas scrubber. Such an absorbent is preferably one from which the promoter can be recovered for recycling to the reaction vessel.

By varying the depth of the contact zone and/or the distance between the point of olefin addition and the point of catalyst and/or isoparaffin addition, the portion of the reaction vessel in which rapidly reacting concentrations of the primary reactants are present may be controlled. Possible criteria for determining the effective reaction time may be the reactivity of the particular olefin as measured by the time required for complete olefin reaction within the contact zone, or the relative solubility of the olefin in the reaction mixture at reaction pressure.

In the stripping zone the volume and velocity of the inert gas may be adjusted to suppress olefin concentrations in the liquid mixture below the contact zone, and/or to accomplish a similar effect in the case of gaseous promoters or catalyst components which might otherwise be carried out in the hydrocarbon stream.

Figure II represents an alternative flow employing a fluid-type catalyst in a reaction vessel divided into an upper contact zone and a lower stripping zone. In this diagram, the liquid hydrocarbon feed is supplied through line 30 and catalyst is supplied from vessel 31 and line 32 to the top section of reaction vessel 33. The mixture descends through contact zone 34 which may be a tray type contactor, packed section or other suitable contacting device including a mechanical agitation means. Olefin-containing gas is introduced at a lower point in the contact zone through line 35 and while unabsorbed passes upward in the vessel. The liquid mixture from the bottom of the contact zone is transferred through a suitable transfer line 50 to the stripping zone 36. This liquid transfer line may embody liquid level control for both sections if desired.

In stripping zone 36, a substantially inert gas is introduced through line 37 and passes upward countercurrent to the descending liquid stream. The latter is taken through line 38 to separator 39 for separation of hydrocarbons from catalyst. The separated catalyst is removed through line 40, and may pass through lines 41 and 32 to be directly recycled to the reaction vessel, or may pass to scrubber 42 for contact with gases leaving the reaction vessel through lines 44 and 45. Unabsorbed gases are vented from the scrubber, while the absorbent passes through lines 43, 41 and 32 to the reaction vessel, or to other means not shown for recovery of valuable components.

The alkylate from separator 39 is taken through line 46 to fractionator 47 where unreacted feed components as well as other low-boiling materials are recycled to the reaction vessel through line 48. Alkylate is removed through line 49 to storage or further fractionation.

This alternate arrangement embodies a separate stripping zone whereby the stripping gas may be wholly or partially excluded from the contact zone by regulation of gas flow through lines 44 and 44A. Thus sufficient gas may flow through 44A to maintain a desired vapor flow upward through the contact zone, or the section below the point of olefin introduction may be relatively quiescent. The portions of the contact zone containing sufficient concentrations of primary reactants to support rapid primary alkylation are again determined by the distance between the point of olefin addition and the point of catalyst-liquid hydrocarbon addition.

While capable of very broad application to alkylation reactions, the process of this invention is particularly adapted to alkylation with the lower-boiling olefins such as ethylene and propylene. Heretofore, the use of ethylene in particular has been restricted because of the relatively severe conditions and highly active catalyst required, which often resulted in the production of very complex mixtures of products, with a large portion usually undesirable because of high-boiling ranges. Thus, for example, conditions effecting alkylation of isobutane with ethylene have been conducive to further alkylation, product fragmentation and the production of high-boiling mixtures in which no particular compound could be identified as a primary or predominant product.

I have found that particular benefits are obtained in the present process by maintaining ethylene concentrations suitable for alkylation in the contact zone and stripping any unreacted ethylene more or less completely from the products leaving the contact zone, according to the present process. These benefits are apparently partially attributable to the fact that the olefin is not present in large concentration in increments of the reaction vessel where secondary or rearrangement reactions may take place. By this improvement a larger proportion of primary alkylation products or those of similar boiling range are obtained at suitable reaction rates. Comparable results are not obtained by merely shortening the contact time, reducing the volume of the reaction vessel or reducing the molar proportions of olefin in the reactant feed.

While the exact reasons for these improved results are not known, it is believed that one factor is the restriction of the olefin alkylating agent to a definite portion of the reaction vessel and that the present process enables a better control of the concentration of alkylating agent in the zone of rapid primary combination. This is accomplished by the stripping action at the bottom of the reaction vessel and the refluxing or absorbent action at the top of the vessel.

Furthermore, internal hot spots or zones of excessive heat evolution due to the alkylation reaction are substantially avoided since the olefin solubility adjusts itself to the temperature at any point in the contact zone and the vapor-liquid equilibrium automatically controls the reaction rate. This effect is of greatest importance in the use of solid catalyst beds wherein conventional heat transfer means are least effective due to low thermal conductivity of the catalyst mass. Moreover, by regulating the temperature of the liquid hydrocarbon reflux, additional precision in temperature control is obtained.

When the catalyst contains or is promoted with volatile components, it is important to retain said materials insofar as possible within the contact zone, and this is accomplished to a large extent by the stripping action of the ascending gas stream in the stripping zone. It may be possible in some cases to return such components to the reaction vessel via the recycled liquid feed stock, but when these compounds are corrosive or tend to condense or solidify at low temperatures, the operating difficulties are often tremendously increased. Thus, the present invention provides an improvement in operating with volatile, sublimable and/or corrosive catalyst compositions, and in maintaining catalyst activity within the contact zone.

In case the gases issuing from the reaction vessel contain materials valuable for recycling which are not absorbed by the liquid reflux, the external scrubbing operation serves to recover said materials and may also be a means for reactivating the catalyst. Considering a catalyst composition which enters the reaction vessel containing an effective amount of a volatile component, the effluent catalyst may contain less than said effective amount at the point of separation from the hydrocarbon alkylate. For example, a catalyst saturated with a gaseous promoter at inlet conditions, may contain smaller quantities of said promoter under outlet conditions of temperature, etc. This used catalyst may be employed to scrub the vented gases to absorb and recover catalyst components carried out in the gas stream, with the conditions adjusted to produce substantially the original catalyst composition. Alternately, a different absorption medium may be employed, and the catalyst component transferred to the used catalyst by other means.

Although it is preferred to adjust reaction conditions to obtain substantially complete olefin utilization, the scrubbing of the vented gases may also serve to recover unreacted olefin gases and return them to the reaction vessel. This may be accomplished, for example, when a relatively stable catalyst-olefin solution is formed under conditions which permit its return to the reaction vessel with recycled catalyst. This procedure may be limited to those olefins which are not particularly susceptible to polymerization in the presence of said catalyst, or whose lower polymers are useful in the alkylation reaction.

Conditions within the reaction vessel are adapted to the alkylation reaction being carried out, and particularly to the catalyst and the alkylating agent. With catalysts such as the strong mineral acids, aluminum halides, boron fluoride complexes, and the like, relatively low temperatures of from about zero to about 200° F. are often employed, while in the alkylation of aromatics such as benzene over solid gel-type silica-alumina catalysts, somewhat higher temperatures up to about 500° F. may be required. The effect of the olefin alkylating agent is usually noted in variations of the optimum temperature range which is generally lower for the higher boiling olefins.

Pressures in the process are ordinarily sufficient to maintained the isoparaffin, aromatic or other alkylatable hydrocarbon in liquid phase at the maximum operating temperatures and/or to afford suitable concentrations of the low-boiling olefins in the reaction vessel. Such pressures may range from about atmospheric to about 500 pounds gage for olefin-isobutane alkylation while in ethylene-benzene alkylation, pressures as high as 1000 pounds gage may be necessary. The proper selection of conditions will be determinable from conventional procedures with a particular catalyst or by experiment.

While the present invention enables the use of relatively low paraffin to olefin ratios in the total fresh feed without formation of undesirable products or loss of olefin, it is usually preferred to provide molar proportions of isoparaffin or other alkylatable hydrocarbon substantially in excess of the olefin alkylating agent. The selection of ratios of these reactants in the total fresh feed will ordinarily be above about 1:1 and may be 4:1, or higher. Recycle of unreacted alkylatable hydrocarbon, as through conduit 19, will increase the ratios somewhat in the total charge to the contact zone.

Specific examples are provided hereinafter to illustrate applications of the present invention to typical alkylation reactions. However, since the number of such examples might be greatly multiplied, no limitation of the process is implied.

*Example I*

Isobutane may be alkylated with ethylene in the presence of a catalyst prepared by saturating water with boron fluoride to form a liquid hydrate composition. The reaction in the presence of this hydrate catalyst is favorable to the formation of normally liquid isoparaffins, having high octane numbers, at temperatures of about 100–130° F., and pressures of 100–300 pounds gage. In carrying out the reaction in mechanically stirred reaction vessels and removing the total effluent for conventional separation of catalyst, alkylate and any unreacted ethylene, considerable loss of boron fluoride in the hydrocarbon phase is experienced, and 60–70 per cent of the butane-free alkylate boils above and below the hexane range.

When the reaction is carried out according to the present invention, ethylene gas is injected at about the mid-point of a contact section of the vertical reaction vessel, said section being packed with carbon rings to give intimate contact between catalyst, isobutane and ethylene. The liquid catalyst and liquid isobutane are added in a volume ratio of about 1:2 to the reaction vessel in a free space above the packed section. Sufficient ethylene is added to result in an isobutane-ethylene molar ratio in the total feed of 4:1 based on the isobutane feed rate.

The liquids flow by gravity through the packed section and enter a lower stripping zone where the stripping is accomplished by methane gas injected at the bottom of the vessel. The stripped effluent hydrocarbons after settling and separation from the catalyst contain little boron fluoride or ethylene and hence these gases are present in negligible amounts in the overhead of the alkylate fractionator. The ascending gas stream entering the contact zone consists of methane, boron fluoride and ethylene, while the gas stream leaving the contact zone consists principally of methane with some boron fluoride. The gases are vented through a pressure release valve and a scrubber wherein the boron fluoride is absorbed at lowered temperature in used catalyst.

In this scheme of operation, boron fluoride consumption per gallon of alkylate, catalyst dilution with heavy hydrocarbons and ethylene removal in the alkylate are greatly reduced. The butane-free alkylate contains 60–70 per cent of material boiling in the hexane range.

*Example II*

In the alkylation of isobutane with ethylene over a solid catalyst consisting of bauxite impregnated with aluminum chloride and a minor amount of hydrogen chloride, liquid isobutane is passed downward through a bed of the granular catalyst, while gaseous ethylene is introduced near the bottom of the catalyst mass and while unabsorbed passes upward countercurrent to the liquid isobutane. The liquid alkylate flows downward from the catalyst bed through a stripping zone countercurrent to an ascending stream of $C_1$–$C_3$ gas which removes from the hydrocarbon liquid and carries upward into the catalyst bed unreacted ethylene and traces of hydrogen chloride. The stripping gas vented from the reaction vessel at a point above the point of isobutane introduction contains only traces of ethylene when the isobutane-ethylene molar ratio is about 4:1, and the contact time based on liquid isobutane feed rate is 30–40 minutes. The catalyst activity is maintained over long periods without additions of promoter.

*Example III*

In the alkylation of benzene with ethylene over granular silica-alumina gel, at a temperature of 490° F. and 1500 pounds gage pressure, benzene feed is added at the top of a bed of catalyst while ethylene is added to the lower section of the catalyst mass in a benzene-ethylene molar ratio of 6:1. The liquid products pass from the bottom of the catalyst zone through a stripping zone where ethylene is removed and returned by an ascending stream of methane gas to the catalyst mass. This mode of operation instead of premixing of the reactants may produce substantially complete ethylene utilization, with the ethylbenzene-diethylbenzene molar ratio in the alkylate increased from about 4:1 to about 8:1.

*Example IV*

In alkylating isopentane with propylene in the presence of a liquid catalyst containing boron fluoride-phosphoric acid addition complex, the apparatus of Figure 1 is employed to produce $C_6$-$C_{10}$ isoparaffins having high octane numbers and substantially free of olefin polymer. The liquid isopentane and catalyst are supplied to the top of a contact zone packed with carbon rings, and propylene is added at a point about midway of the contact zone in proportions to give an isopentane-propylene molar ratio of 4:1. The liquid mixture passes from the contact zone through a relatively quiescent zone countercurrent to an ascending stream of propane gas. The propane strips dissolved propylene and boron fluoride from the liquid hydrocarbons, and returns these components to the contact zone.

Catalyst and hydrocarbons are separated in a settling zone, with the latter being fractionated to separate isopentane for recycling to the reaction. Used catalyst may be partially recycled direct to the reaction vessel, while a portion is cooled to 20-40° F. and used to absorb boron fluoride from the gas stream vented from the top of the reaction vessel. In this system, the recovery of boron fluoride may be sufficiently complete to eliminate regular additions of boron fluoride to resaturate the catalyst.

The alkylate when compared with that produced by premixing the reactants contains substantially increased proportions of isoparaffins suitable for blending in aviation fuels, and a particular improvement in octane rating is obtained.

It will be appreciated that various modifications may be practiced by one skilled in the art without departing from the spirit of the teachings or from the scope of the claims.

I claim:

1. A process for producing low-boiling normally liquid paraffin hydrocarbons by alkylating a low-boiling alkylatable hydrocarbon with a normally gaseous olefin in the presence of a liquid catalyst complex comprising a normally gaseous constituent, which comprises passing a liquid mixture of said alkylatable hydrocarbon and said catalyst complex downward through a catalytic alkylation zone, adding near the bottom of said zone a gaseous olefin, withdrawing from the bottom of said alkylation zone an effluent liquid mixture comprising catalyst and hydrocarbons and containing in solution said normally gaseous catalyst constituent and unreacted gaseous olefin and passing same to a stripping zone, passing through said effluent liquid mixture in said stripping zone an inert gas to vaporize said dissolved gaseous constituents, passing a resulting gaseous mixture from said stripping zone to the bottom of said alkylation zone, and withdrawing from said stripping zone a hydrocarbon mixture containing alkylate so produced.

2. A process for alkylating hydrocarbons which comprises introducing a liquid alkylatable hydrocarbon to the top of a reaction zone, introducing a gaseous alkylating agent to the bottom of said reaction zone, maintaining in said reaction zone an alkylation catalyst and alkylating conditions such that said alkylatable hydrocarbon remains primarily in liquid phase during its passage down said reaction zone and such that a gas phase is also present in said reaction zone, passing liquid effluents from the bottom of said reaction zone to the top of a stripping zone, maintaining in said reaction zone alkylation reaction conditions and a flow of reactants such that said liquid effluents contain dissolved unreacted alkylating agent, introducing an inert stripping gas to the bottom of said stripping zone and passing same upwardly through said stripping zone countercurrent to liquid effluents of said reaction zone to remove in vapor form volatile impurities therefrom including said dissolved alkylating agent, removing from the bottom of said stripping zone a purified alkylation effluent, removing from the top of said stripping zone said stripping gas and gaseous impurities removed from said liquid reaction zone effluents, passing said gas to the bottom of said reaction zone to deliver said impurities to said reaction zone, and finally removing from the top of said reaction zone said stripping gas.

3. The process of claim 2 in which said alkylation catalyst comprises boron fluoride and in which liquid effluents of said reaction zone contain uncombined boron fluoride as an impurity, said boron fluoride also being removed in said stripping zone as a gas and returned to said reaction zone in the gas passed from the top of said stripping zone to the bottom of said reaction zone.

4. The process of claim 2 in which said alkylation catalyst comprises a complex of water and boron fluoride and in which boron fluoride is removed in said liquid effluents of said reaction zone as said impurity.

5. The process of claim 2 in which said alkylation catalyst comprises a complex of an acid of phosphorus and boron fluoride and in which boron fluoride is removed in said liquid effluents of said reaction zone as said impurity.

6. A process for alkylating hydrocarbons, which comprises introducing a liquid alkylatable hydrocarbon to the top of a reaction zone, introducing a vaporizable alkylating agent to the bottom of said reaction zone, maintaining in said reaction zone an alkylation catalyst comprising a complex of boron fluoride and an acid of phosphorus and alkylating conditions such that said alkylatable hydrocarbon remains primarily in liquid phase during its passage down said reaction zone and such that a gas phase comprising an inert stripping gas and also said vaporizable alkylating agent is also present in said zone, passing liquid effluents containing dissolved boron fluoride and unreacted vaporizable alkylating agent as impurities from the bottom of said reaction zone to a stripping zone, introducing to said stripping zone an inert stripping gas, contacting said effluents in said stripping zone with said stripping gas to remove boron fluoride and vaporizable alkylating agent as gases, removing purified liquid reaction zone effluents from said stripping zone, passing a gas comprising said stripping gas and boron fluoride and vaporizable alkylating agent from said stripping zone to the bottom of said reaction zone, passing from the top of said reaction zone a gas comprising said stripping gas and a minor amount of boron fluoride, contacting the last said gas with a liquid acid of phosphorus to absorb said boron fluoride, and passing a resulting liquid boron fluoride-acid of phosphorus mixture to said reaction zone as at least a part of said alkylation catalyst.

7. The process of claim 6 in which said alkylatable hydrocarbon is isopentane and said alkylating agent is a normally gaseous olefin.

8. The process of claim 2 in which said alkylatable hydrocarbon is a butane, said alkylating agent is ethylene, and said catalyst comprises aluminum chloride and hydrogen chloride.

9. A process for producing low-boiling normally liquid paraffin hydrocarbons by alkylating isobutane with ethylene in the presence of a liquid catalyst complex resulting from saturating water with boron trifluoride and containing at least a minor amount of free boron trifluoride, which comprises passing a liquid mixture of isobutane and said complex downward through a catalytic alkylation zone, adding near the bottom of said zone gaseous ethylene, withdrawing from the bottom of said alkylation zone an effluent liquid mixture comprising catalyst and hydrocarbons, and containing in solution free boron trifluoride and unreacted ethylene and passing same to a stripping zone, passing through said effluent liquid mixture in said stripping zone an inert gas to vaporize said dissolved boron trifluoride and ethylene, passing a resulting gaseous mixture from said stripping zone to the bottom of said alkylation zone, and withdrawing from said stripping zone a hydrocarbon mixture containing normally liquid paraffin hydrocarbons so produced and a liquid catalyst mixture, passing a gaseous mixture substantially free of olefins and containing free boron trifluoride from the top of said alkylation zone to a scrubber, passing a portion of said liquid catalyst mixture from said stripping zone to said scrubber to remove boron trifluoride from the last said gaseous mixture, and passing the resulting liquid, boron trifluoride-containing catalyst from said scrubber to the top of said alkylation zone.

10. A process for producing low-boiling normally liquid paraffin hydrocarbons by alkylating a low-boiling alkylatable hydrocarbon with a normally gaseous olefin in the presence of a liquid catalyst complex comprising a normally gaseous constituent, which comprises passing a liquid mixture of said alkylatable hydrocarbon and said catalyst complex downward through a catalytic alkylation zone, adding near the bottom of said zone a gaseous olefin, withdrawing from the bottom of said alkylation zone an effluent liquid mixture comprising catalyst and hydrocarbons and containing in solution said normally gaseous catalyst constituent and unreacted gaseous olefin and passing same to a stripping zone, passing through said effluent liquid mixture in said stripping zone an inert gas to vaporize said dissolved gaseous constituents, passing a resulting gaseous mixture from said stripping zone to the bottom of said alkylation zone, and withdrawing from said stripping zone a hydrocarbon mixture containing alkylate so produced and a liquid catalyst mixture, passing a gaseous mixture substantially free of olefins and comprising said inert gas and said normally gaseous catalyst constituent from the top of said alkylation zone to a scrubber, passing a portion of said liquid catalyst mixture from said stripping zone to said scrubber to absorb said gaseous catalyst constituent, and passing the resulting liquid catalyst mixture from said scrubber to the top of said alkylation zone.

11. A process for producing low-boiling normally liquid paraffin hydrocarbons by alkylating isobutane with ethylene in the presence of a liquid catalyst complex resulting from saturating water with boron trifluoride and containing at least a minor amount of free boron trifluoride, which comprises passing a liquid mixture of isobutane and said complex downward through a catalytic alkylation zone, adding near the bottom of said zone gaseous ethylene, withdrawing from the bottom of said alkylation zone an effluent liquid mixture comprising catalyst and hydrocarbons, and containing in solution free boron trifluoride and unreacted ethylene and passing same to a stripping zone, passing through said effluent liquid mixture in said stripping zone an inert gas to vaporize said dissolved boron trifluoride and ethylene, passing a resulting gaseous mixture from said stripping zone to the bottom of said alkylation zone, and withdrawing from said stripping zone a hydrocarbon mixture containing normally liquid paraffin hydrocarbons so produced.

WALTER A. SCHULZE.

---

CERTIFICATE OF CORRECTION.

Patent No. 2,378,040. June 12, 1945.

WALTER A. SCHULZE.

It is hereby certified that error appears in the printed specification of the above numbered patent requiring correction as follows: Page 1, second column, line 8, for "ther eaction" read --the reaction--; line 44, for "use of" read --use or--; page 2, second column, line 32, for "line 8" read --line 9--; line 36, after "through" insert --line--; page 4, first column, line 33, for "maintained" read --maintain--; and that the said Letters Patent should be read with this correction therein that the same may conform to the record of the case in the Patent Office.

Signed and sealed this 16th day of October, A. D. 1945.

Leslie Frazer (Seal) First Assistant Commissioner of Patents.

fluoride-acid of phosphorus mixture to said reaction zone as at least a part of said alkylation catalyst.

7. The process of claim 6 in which said alkylatable hydrocarbon is isopentane and said alkylating agent is a normally gaseous olefin.

8. The process of claim 2 in which said alkylatable hydrocarbon is a butane, said alkylating agent is ethylene, and said catalyst comprises aluminum chloride and hydrogen chloride.

9. A process for producing low-boiling normally liquid paraffin hydrocarbons by alkylating isobutane with ethylene in the presence of a liquid catalyst complex resulting from saturating water with boron trifluoride and containing at least a minor amount of free boron trifluoride, which comprises passing a liquid mixture of isobutane and said complex downward through a catalytic alkylation zone, adding near the bottom of said zone gaseous ethylene, withdrawing from the bottom of said alkylation zone an effluent liquid mixture comprising catalyst and hydrocarbons, and containing in solution free boron trifluoride and unreacted ethylene and passing same to a stripping zone, passing through said effluent liquid mixture in said stripping zone an inert gas to vaporize said dissolved boron trifluoride and ethylene, passing a resulting gaseous mixture from said stripping zone to the bottom of said alkylation zone, and withdrawing from said stripping zone a hydrocarbon mixture containing normally liquid paraffin hydrocarbons so produced and a liquid catalyst mixture, passing a gaseous mixture substantially free of olefins and containing free boron trifluoride from the top of said alkylation zone to a scrubber, passing a portion of said liquid catalyst mixture from said stripping zone to said scrubber to remove boron trifluoride from the last said gaseous mixture, and passing the resulting liquid, boron trifluoride-containing catalyst from said scrubber to the top of said alkylation zone.

10. A process for producing low-boiling normally liquid paraffin hydrocarbons by alkylating a low-boiling alkylatable hydrocarbon with a normally gaseous olefin in the presence of a liquid catalyst complex comprising a normally gaseous constituent, which comprises passing a liquid mixture of said alkylatable hydrocarbon and said catalyst complex downward through a catalytic alkylation zone, adding near the bottom of said zone a gaseous olefin, withdrawing from the bottom of said alkylation zone an effluent liquid mixture comprising catalyst and hydrocarbons and containing in solution said normally gaseous catalyst constituent and unreacted gaseous olefin and passing same to a stripping zone, passing through said effluent liquid mixture in said stripping zone an inert gas to vaporize said dissolved gaseous constituents, passing a resulting gaseous mixture from said stripping zone to the bottom of said alkylation zone, and withdrawing from said stripping zone a hydrocarbon mixture containing alkylate so produced and a liquid catalyst mixture, passing a gaseous mixture substantially free of olefins and comprising said inert gas and said normally gaseous catalyst constituent from the top of said alkylation zone to a scrubber, passing a portion of said liquid catalyst mixture from said stripping zone to said scrubber to absorb said gaseous catalyst constituent, and passing the resulting liquid catalyst mixture from said scrubber to the top of said alkylation zone.

11. A process for producing low-boiling normally liquid paraffin hydrocarbons by alkylating isobutane with ethylene in the presence of a liquid catalyst complex resulting from saturating water with boron trifluoride and containing at least a minor amount of free boron trifluoride, which comprises passing a liquid mixture of isobutane and said complex downward through a catalytic alkylation zone, adding near the bottom of said zone gaseous ethylene, withdrawing from the bottom of said alkylation zone an effluent liquid mixture comprising catalyst and hydrocarbons, and containing in solution free boron trifluoride and unreacted ethylene and passing same to a stripping zone, passing through said effluent liquid mixture in said stripping zone an inert gas to vaporize said dissolved boron trifluoride and ethylene, passing a resulting gaseous mixture from said stripping zone to the bottom of said alkylation zone, and withdrawing from said stripping zone a hydrocarbon mixture containing normally liquid paraffin hydrocarbons so produced.

WALTER A. SCHULZE.

CERTIFICATE OF CORRECTION.

Patent No. 2,378,040.   June 12, 1945.

WALTER A. SCHULZE.

It is hereby certified that error appears in the printed specification of the above numbered patent requiring correction as follows: Page 1, second column, line 8, for "ther eaction" read --the reaction--; line 44, for "use of" read --use or--; page 2, second column, line 32, for "line 8" read --line 9--; line 36, after "through" insert --line--; page 4, first column, line 33, for "maintained" read --maintain--; and that the said Letters Patent should be read with this correction therein that the same may conform to the record of the case in the Patent Office.

Signed and sealed this 16th day of October, A. D. 1945.

Leslie Frazer (Seal)   First Assistant Commissioner of Patents.